United States Patent [19]
Hatley

[11] 3,707,799
[45] Jan. 2, 1973

[54] FISH NET RETRIEVAL APPARATUS

[76] Inventor: Lowell J. Hatley, 5452 40th Avenue West, Seattle, Wash. 98199

[22] Filed: Aug. 10, 1970

[21] Appl. No.: 62,516

[52] U.S. Cl. ...................................................43/8
[51] Int. Cl. ..........................................A01k 69/02
[58] Field of Search.............43/8, 14, 4.5, 7, 9, 54.5, 43/4; 242/67, 67.1, 56.9, 55, 55.1, 117, 53; 254/137, 138, 175.3, 175.5, 183, 184

[56] References Cited

UNITED STATES PATENTS

| 3,047,973 | 8/1962 | Puretic | 43/8 |
| 1,353,604 | 9/1920 | Marchius | 254/137 |

Primary Examiner—Warner H. Camp
Attorney—Thomas W. Secrest

[57] ABSTRACT

Mechanically, this apparatus comprises two spaced-apart spools or drums and an endless belt running around these drums. There is a means to power the drums and the endless belt for reeling in the fishing net.

13 Claims, 8 Drawing Figures

PATENTED JAN 2 1973 3,707,799

INVENTOR.
Lowell J. Hatley
BY
TW Servest
ATTORNEY.

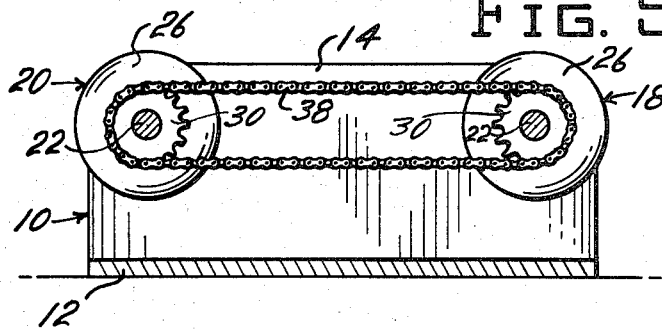
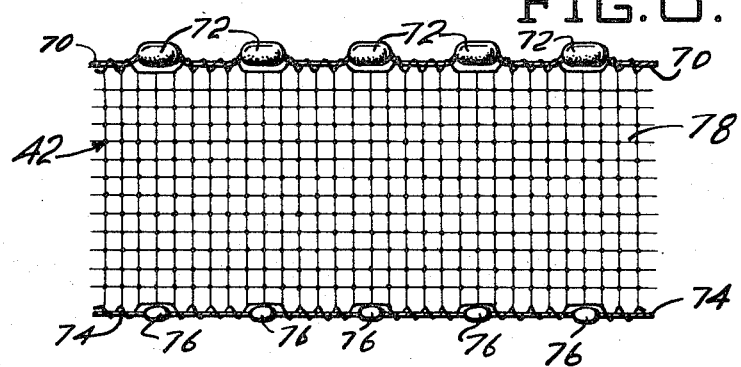
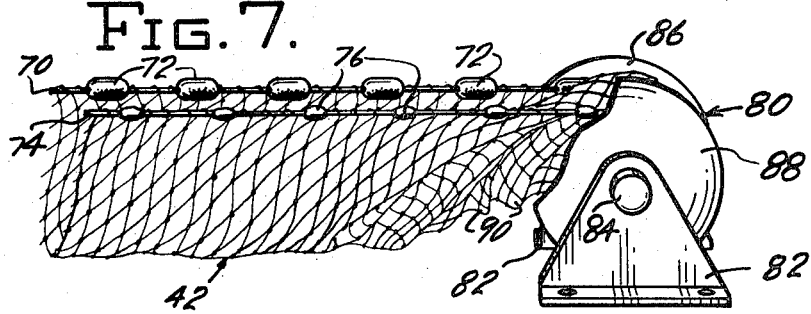
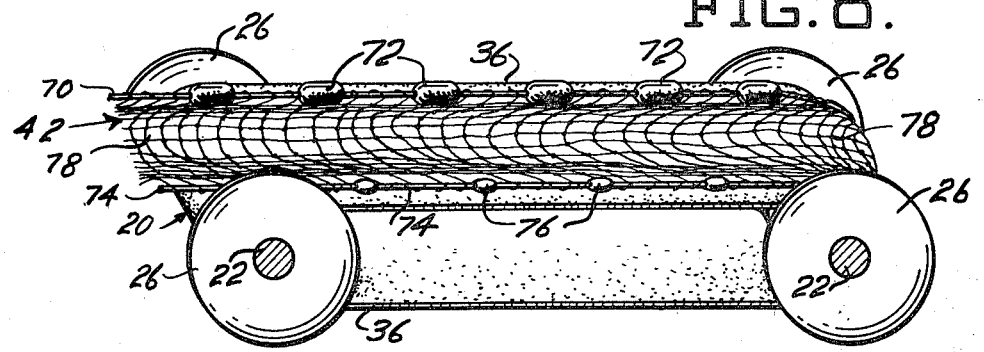
INVENTOR
Lowell J. Hatley
BY
TW Secrest

FISH NET RETRIEVAL APPARATUS

In my lifetime I worked as a fisherman, worked on fishing boats, operated fishing boats and have owned fishing boats. From this experience I have become familiar with many of the ways fish are caught and also some of the problems encountered in catching the fish and in operating the equipment for catching fish.

This invention relates to commercial fishing from small fishing boats. This type of commercial fishing is an important industry on the northern portion of the Pacific Coast, from Northern Oregon to Alaska and including Southwestern Alaska. At the present time governmental regulations restrict the hours of the day of the fishing season in which fisherman may work. Also, governmental regulations restrict the size of the fishing boats. For example, in Alaska the size of the fishing boats will vary from 30 feet to approximately 50 feet. The limit for the length of the independent commercial fishing boat in Alaskan waters is approximately fifty feet.

Salmon, which is a common fish in the Alaskan waters, run in large schools of fish but do not run on stated or definite time schedules. If a fisherman has poor luck or inadequate equipment he may miss catching the governmental allowance of fish for that day. For example, on July 3, 1969 the boat I own recorded a catch of 364 fish. However, on July 5, 1969 this same boat recorded a catch of only 7 fish. This illustrates the large variation in the number of fish which may be caught by a boat on substantially two consecutive days.

The fishing net used may vary in width but one fishing net I have used was approximately 30 feet in width and had a length of approximately 1,800 feet. This net was wound onto a single large spool or single large drum. A typical single spool fishing net retrieval apparatus may have a height of 5 feet, a width of 4 feet, a length of 4 feet and a weight in excess of 500 pounds. With a single large spool for retrieving the fish net the spool is positioned near the bow of the fish boat. It is to be recalled that the length and the width of this single spool are approximately four feet by four feet. With the spool positioned on the deck of the fish boat it is necessary to have that portion of the deck, underneath the spool, reinforced to carry this concentrated load of the single spool. The spool is located, to repeat, near the bow of the fish boat. The fish net is reeled in and around this spool. A fisherman or fishermen standing near the spool and near the bow of the fish boat pick off the salmon from the net and throw the salmon into holding or carrying bins or lockers. There is very little room for the fishermen to work and to pick off the fish from the net. Further, the single spool, in relation to the small fishing boat on which it is mounted, presents a relatively high center of gravity having a height of approximately 5 feet or greater.

From having worked with such a single spool fish net retrieval apparatus I thought of another type of fish net retrieval apparatus having two spaced-apart drums or spools and an endless belt running around these two spaced-apart drums or spools. The fish net is attached to the endless belt. With the running of the endless belt around the two spaced-apart spools the fish net wraps around the endless belt and also around the two spaced-apart spools. I can see many advantages to the use of two spaced-apart spools as it is possible to have a larger base area and therefore it is not necessary to have as heavy a deck or as heavy a reinforcing for the deck as with the single spool for reeling in the fish net. For example, the overall length of the two-spool apparatus can be 8 feet and the width can be 4 feet. The height of the two-spool apparatus is approximately 36 inches so as to present a lower center of gravity and therefore more stability for the small boat. The weight of the two-spool apparatus is approximately 500 pounds. A further advantage is that the two-spool fish net and retrieval apparatus can be positioned closer to the center of the small boat than a single spool apparatus and therefore there is more room for the fishermen to pick the fish off of the net and throw them into the storage lockers.

With this background having worked with the apparatus for reeling in and playing out fish nets an object of this invention is to provide a fish net retrieval apparatus having a low center of gravity so as to add to the stability of the fishing boat; to provide such apparatus having a larger base area for weight distribution of the apparatus and therefore less centralized loading of the apparatus on the bow of the fishing boat which requires less reinforcing under the deck of the fishing boat; to provide such a fish net retrieval apparatus where there is less backlash of the fish net upon reeling into and onto the apparatus than with a single-spool apparatus; to provide such a fish net retrieval apparatus whereby there is less damage to the fish net than with a single-spool apparatus; to provide such a fish net retrieval apparatus requiring less time to repair the fish net than with a single-spool fish net retrieval apparatus; to provide such a fish net retrieval apparatus which can be positioned near the center of the fishing boat so as to allow more room for the fishermen to pick the fish from the fish net; to provide such a fish net retrieval apparatus which automatically retrieves and stores the fish net; and, to provide such an apparatus which requires less power for the same capacity, than a single-spool apparatus, because of the smaller diameter of the drums of my apparatus.

These and other important objects and advantages of the invention will be more particularly brought forth upon reference to the accompanying drawings, the detailed description of the invention and the appended claims.

In the drawings:

FIG. 1 is a side elevational view of a fishing boat, with the gunwale broken away, to illustrate the fish retrieval apparatus comprising the two spaced-apart spools and a fish net being wrapped around said spools, and with the fisherman picking the fish off of the net and tossing them into a storage locker;

FIG. 2, on an enlarged scale, is a plan view looking down on the stern of the boat and illustrates the fish retrieval apparatus comprising the two spaced apart spools or drums, the endless belt running around said drums, and a fish net being restricted by a guide means and fish on said fish net, for introduction to said fish net retrieval apparatus;

FIG. 3, taken on line 3—3 of FIG. 2, is a vertical longitudinal cross-sectional view illustrating the fish net retrieval apparatus and the two spaced-apart spools, the endless belt running around said two spools, and the fish net being reeled in and wound around said two spaced-apart spools and said endless belt;

FIG. 5 is a vertical longitudinal cross-sectional view illustrating the two spaced-apart spools, the sprockets associated with said spools and a chain running around said sprockets;

FIG. 6 is a fragmentary view illustrating the fish net and on the upper part illustrates the float line and the floats and on the lower part illustrates the weight line and the weights, and between the float line and the weight line the net for snaring the fish;

FIG. 7 is a fragmentary view illustrating a one-spool fish net retrieval apparatus, the fish net and the backlash of the fish net while being wound on said spool; and, FIG. 8 is a perspective schematic view illustrating my fish net retrieval apparatus comprising two spaced-apart spools, the endless belt and the fish net wrapped around said two spools and the endless belt and with the net so arranged that there is no backlash of the net upon being reeled around said two spools.

Figure 2:
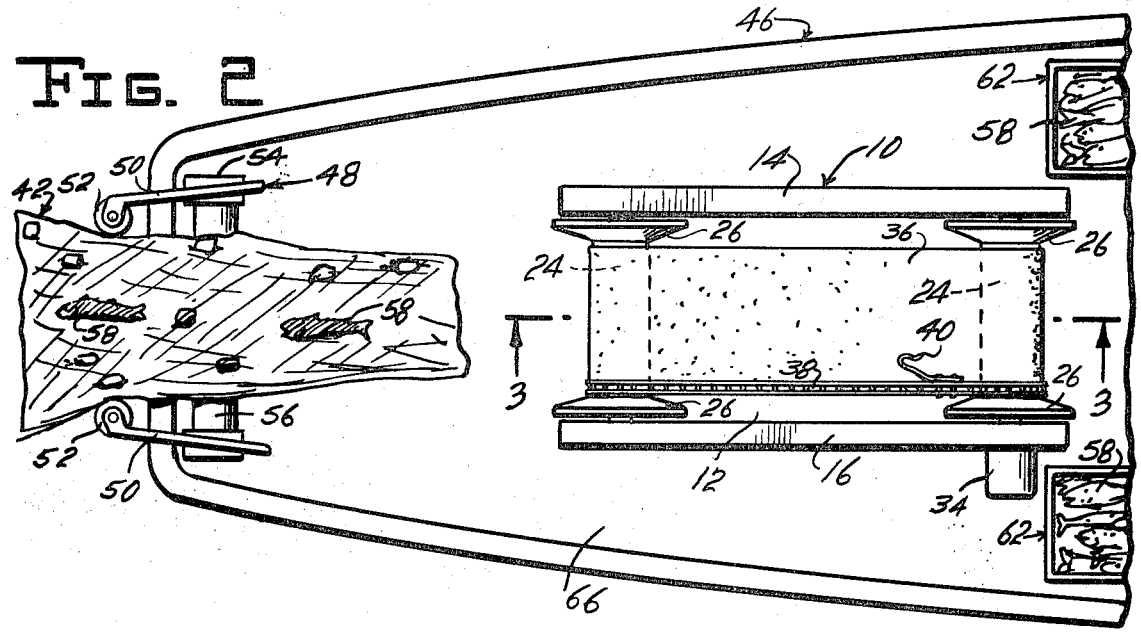
Figure 3:
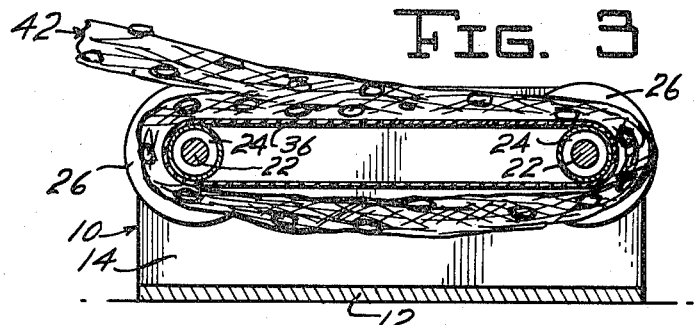

In FIGS. 2, 3 and 5 there is illustrated the fish net retrieval apparatus 10. This apparatus comprises a frame having a base 12 and upright sides 14 and 16.

The sides 14 and 16 position two spaced-apart spools 18 and 20. Each spool comprises a shaft 22, a roller 24 mounted on the shaft 22, and tapered rims 26 on the shaft 22. In FIGS. 2 and 5 it is seen that there are mounted on each of the shafts 22, in FIG. 2 the lower part of the shaft 22, a sprocket 30.

The shafts 22 are journaled in the sides 14 and 16 of the frame.

In FIG. 2 it is seen that there is a power means or a driving means 34 connecting with the right shaft 22. The power means or driving means 34 may be an electric motor and gear box combination, a hydraulic motor, an internal combustion engine and gear box combination or other suitable driving means. The power means 34 is a schematic illustration of a suitable power means and depends upon the available power in each fishing boat.

Figure 4:
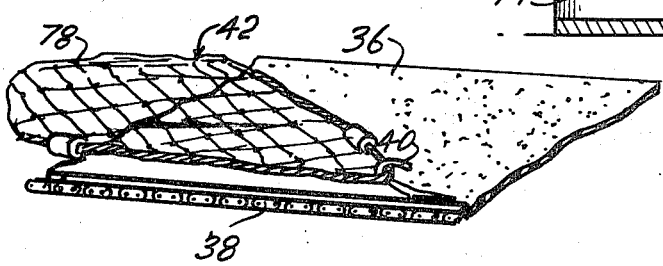
FIG. 4 is a perspective fragmentary view illustrating the endless belt, the chain attached to said endless belt, and the attaching or hooking means for attaching the fish net to the endless belt.

There is an endless belt 36 running around the two rollers 24 of the two spools 18 and 20. In FIG. 2 it is seen that on the lower edge, or one edge, of the belt 36 that there is attached an integral chain 38. The integral chain runs around the sprockets 30 of the spools 18 and 20. In FIG. 4 there is illustrated the belt 36 and the chain 38. The chain 38 meshes with the sprockets 30 on the spools 18 and 20. The power means 34 rotates the spool 18 and the sprocket 30 of the spool 18 drive the chain 38 and the belt 36.

It is seen that on the belt 36 and near the chain 38 there is a hooking means or an attaching means or a hook 40 for connecting the belt 36 to a fish net 42.

Figure 1:
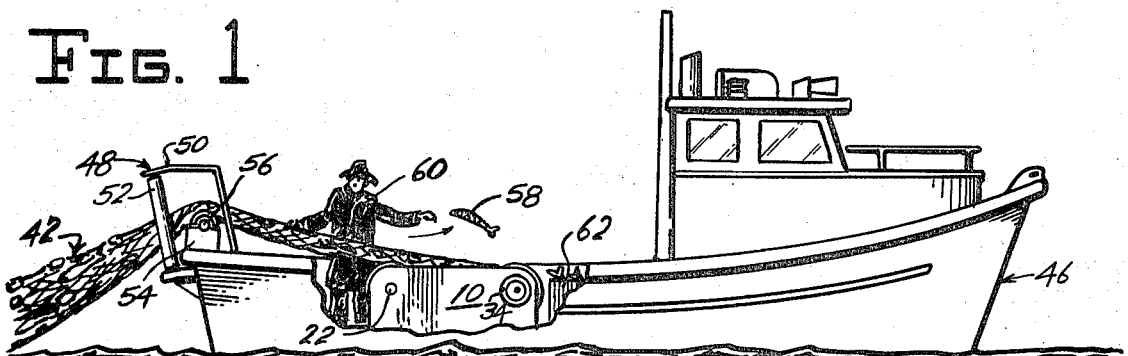

The fish net retrieval apparatus 10 can be positioned on a fishing boat 46. In FIG. 1 it is seen that the fish net retrieval apparatus 10 is positioned substantially near the central portion of the fishing boat 46. The fish net 42 is reeled in over the stern of the boat 46. On the stern of the boat there is a guide 48 having arms 50 for holding and positioning two spaced-apart rollers 52.

Also, there is a base member 54. A roller 56 is journaled in the base member 54. The fish net 42 and the fish 58 in the fish net 42 are reeled in between the two vertical rollers 52 to narrow the width of the fish net 42 and over the roller 46 so that the fish net 42 will not contact, and become damaged, on the stern of the boat 46.

Again, in FIG. 4 there is illustrated the attaching of the fish net 42 to the endless belt 36. In FIGS. 1 and 3 there is illustrated the reeling in and the winding of the fish net 42 on the fish net retrieval apparatus 10 and around the two spaced-apart spool 18 and 20.

In FIG. 1 there is illustrated a fisherman 60 picking the fish 58 off of the fish net 42 and storing the fish in the storage locker 62. With the fish net retrieval apparatus 10 positioned more towards the central portion of the fishing boat 46 the fisherman 60 does not have to work so close towards the stern of the boat and therefore has more room in which to work and to pick the fish 58 from the net 42.

In FIG. 3 it is seen that the fish net 42 has been wrapped around the two spools 18 and 20 to be in the general configuration of an ellipse having a long major axis and a relatively short minor axis.

In FIG. 6 there is illustrated the fish net 42 having a float line 70 attached to floats 72. The floats 72 may be hollow glass spheres or balls, solid plastic foam, cork or wood. On the other side of the fish net 42 there is a weight line 74 attached to weights 76. The weights 76 may be lead or other suitable weights. In between the float line 70 and the weight line 74 there may be webbing 78. Again, it is called to the readers' attention that the fish net 42 may have an approximate width of 30 feet and an overall length of approximately 1,800 feet. The individual fish net 42 will vary from fisherman to fisherman.

In FIG. 7 there is illustrated a single spool fish net retrieval apparatus 80 having spaced-apart trunnions 82, a shaft 84, and rims 86 and 88.

The fish net 42 may be reeled in and around the shaft 84 of the single spool 80. It is seen that in reeling in the fish net 42 that the central portion of the fish net 42 falls back and onto its self as illustrated at 90. This is called or termed backlash. The central portion of the net becomes intertwined. Upon the reeling out of the fish net 42 the intertwined portion of the net, illustrated by the reference numeral 90, does not readily detach itself from other parts of the fish net and the fish net hangs up onto the single spool 80. With the fish boat moving the drag of the water on the net in the water is sufficient to tear and rip parts of the fish net. This damages the fish net and forms holes into the net. As a result the net is damaged and it takes the time of a fisherman to repair the fish net.

In FIGS. 3 and 8 there is illustrated the wrapping of the fish net 42 around the spools 18 and 20 and the endless belt 36. It is seen that with the relatively long major axis and the relatively short minor axis that the central portion or webbing 78 of the fish net does not backlash but wraps relatively evenly onto the endless belt 36. In this way there is avoided the backlash, the intermingling of the central portion 78 of the net with adjacent parts of the central portion of the net. Upon the reeling out of the fish net by allowing the fish net to play into the water and be reeled off of the spaced-apart spools 18 and 20 the fish net is not entangled with itself and therefore does not hang up and tear to form holes. The fish net is not hurt. It is not necessary to repair the fish net and therefore take the time of a fisherman to repair the fish net. In this way there is a saving of time of the fisherman and therefore less expense.

The fish net 42 may be reeled out automatically from the fish net retrieval apparatus 10 by allowing the net to be positioned in the water and then propelling the boat forwardly to allow the fish net to drag and be reeled off of the apparatus 10.

From the foregoing it is seen that my fish net retrieval apparatus 10 having the two spaced-apart spools 18 and 20 has a relatively large base area and therefore the weight of this apparatus can be distributed over a relatively large area. It is not necessary to have extra reinforcements for the deck of the fishing boat underneath this retrieval apparatus 10. Further, the profile of this retrieval apparatus 10 is relatively low, about three feet in height, as compared with a single spool apparatus having approximately a five foot height profile. This means that the center of gravity of my retrieval apparatus is less than that of a retrieval apparatus having a single spool and therefore there is more stability imparted to the fishing boat. Further, it is possible to position the retrieval apparatus closer to the central portion of the boat to allow the fishermen more room in which to work. The smaller drums or spools 18 and 20 of my apparatus require less power to rotate than a large single-spool apparatus.

In FIG. 2, a plan view of the stern of the boat, there is illustrated the fish net retrieval apparatus 10 positioned on the deck 66 of the boat. The forward end of the fish net retrieval apparatus 10 is positioned near the storage locker 62. The fisherman 60, or fishermen 60, can stand between the guide 48 and the fish net retrieval apparatus 10 and pick the fish 58 off of the net 42 and throw these fish into the storage lockers 62. In FIG. 2, and also FIG. 1, it is seen that there is considerable area for the fishermen 60 to stand and to work.

With the foregoing description of my invention I hereby claim:

1. A method for storing a fish net, said method comprising:
   a. positioning said net, when seen in a side elevational view, in the general configuration of an ellipse and with said net wrapped around itself.
2. A method according to claim 1 and comprising:
   a. said net being positioned with the major axis of said ellipse in a generally horizontal position.
3. A method for storing a fish net, said method comprising:
   a. positioning said net around two spaced-apart spools and with said net wrapped around itself.
4. A method according to claim 3 and comprising:
   a. winding and wrapping said net around said two spaced-apart spools.
5. A method according to claim 3 and comprising:
   a. said net in being positioned around said two spaced-apart spools having, when seen in a side elevational view, a configuration of an ellipse having a major axis and a minor axis.
6. A method according to claim 5 and comprising:
   a. said net being positioned with the major axis of said ellipse in a generally horizontal position.
7. A method for storing a fish net on a boat, said method comprising:
   a. removing said net from surrounding water and onto said boat; and,
   b. positioning said net, when seen in a side elevational view, in the general configuration of an ellipse on said boat and with said net wrapped around itself.
8. A method according to claim 7 and comprising:
   a. said net being positioned with the major axis of said ellipse in a generally horizontal position so as to present a lower center of gravity on said boat.
9. A method for storing a fish net on a boat, said method comprising:
   a. removing said net from surrounding water and onto said boat; and,
   b. positioning said net around two spaced-apart spools on said boat and with said net wrapped around itself.
10. A method according to claim 9 and comprising:
    a. winding and wrapping said net around said two spaced-apart spools.
11. A method according to claim 9 and comprising:
    a. said net in being positioned around said two spaced-apart spools-having, when seen in a side elevational view, a configuration of an ellipse having a major axis and a minor axis.
12. A method according to claim 11 and comprising:
    a. said net being positioned with the major axis of said ellipse in a generally horizontal position.
13. A method for reeling out a fish net from a boat, said method comprising:
    a. said net being positioned on said boat, when seen in a side elevational view, in the general configuration of an ellipse; and,
    b. by introducing the last retrieved part of said net to the surrounding water and by moving forwardly said boat, automatically feeding out said net.

* * * * *